Oct. 20, 1959 O. T. THOMPSON ET AL 2,909,089
BOLT-HOLDING TYPE SOCKET WRENCHES
Filed Aug. 22, 1957
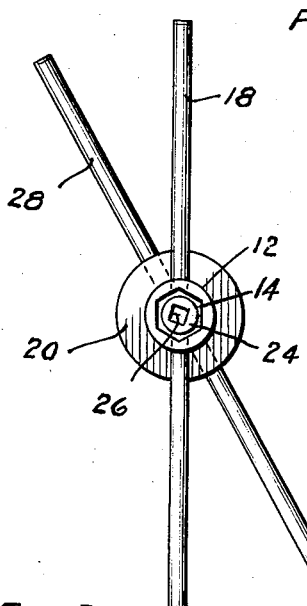
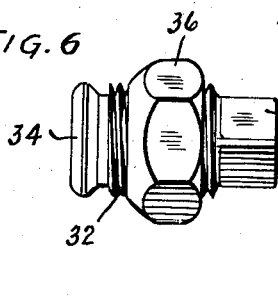
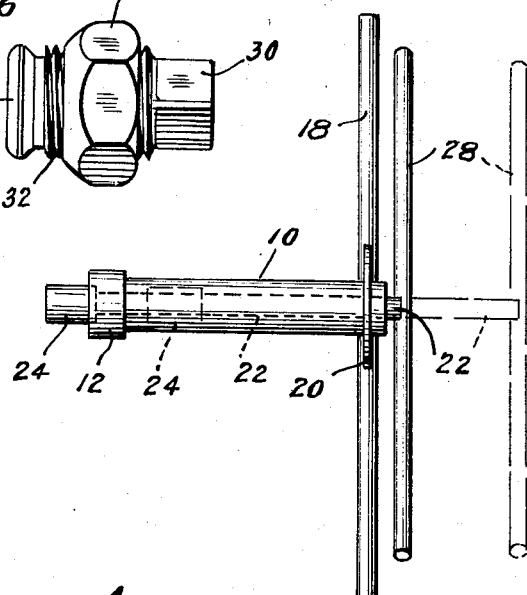
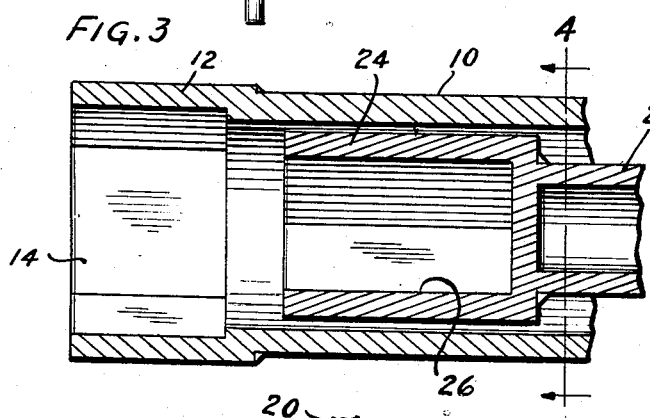
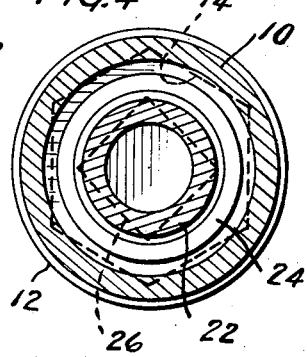
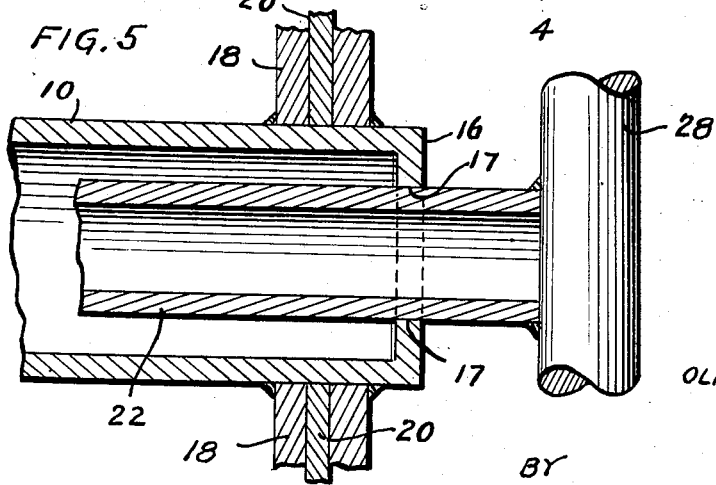
INVENTORS
OLIVER T. THOMPSON
CYRUS F. COOK
BY Rey Eilers
ATTY.

United States Patent Office 2,909,089
Patented Oct. 20, 1959

2,909,089

BOLT-HOLDING TYPE SOCKET WRENCHES

Oliver Thomas Thompson, Waynesville, Mo., and Cyrus Francis Cook, Coco Beach, Fla., assignors of one-third to C. Willard Max, Clayton, Mo.

Application August 22, 1957, Serial No. 679,584

1 Claim. (Cl. 81—55)

This invention relates to improvements in wrenches. More particularly this invention relates to improvements in wrenches that are usable to mount and dismount the dual wheels of automotive vehicles.

It is therefore an object of the present invention to provide an improved wrench that can be used in mounting and dismounting the dual wheels of automotive vehicles.

Some automotive vehicles, as for example trucks and busses, are provided with dual wheels. The manufacturers of some of those vehicles equip those vehicles with hubs that carry axially-directed, outwardly-extending threaded studs, and those studs receive and support the innermost of the dual wheels. The innermost wheels of those vehicles have openings through the webs thereof to accommodate the studs, and those wheels are fixedly held in position on the studs and against the hubs of those vehicles by socket nuts which have internal threads that engage and telescope over the threaded studs. Those socket nuts have radially extending flanges to engage the opening-defining portions of the webs, and to press the webs, of the innermost wheels against the hubs of those vehicles as the socket nuts are tightened on the threaded studs. Those socket nuts have polygonal wrench-receiving surfaces to make it easy to thread them onto and off of the threaded studs; and they have external threads. The outermost wheels of those vehicles have openings through their webs that are larger in diameter than the polygonal wrench-receiving surfaces or the external threads on the socket nuts and those openings telescope over the socket nuts. Those openings in the webs of the outermost wheels are, however, smaller in diameter than the radially-extending flanges on the socket nuts. Consequently, the opening-defining portions of the webs of the outermost wheels will seat against the outer faces of the radially-extending flanges on the socket nuts. Large diameter nuts will then be telescoped over the polygonal wrench-receiving surfaces on the socket nuts and will be threaded onto the external threads of those socket nuts. Those large diameter nuts will press the webs of the outermost wheels against the outer faces of the radially-extending flanges on the socket nuts to hold those outermost wheels solidly in position.

Heretofore, it has been exceedingly difficult to separate the large diameter nuts and the socket nuts from the outermost wheel in the event the socket nuts became separated from the studs. The large diameter nuts are threaded onto the external threads of the socket nuts with great force to prevent accidental loss of a wheel during movement; and hence those large diameter nuts tend to resist rotation relative to the socket nuts as those large diameter nuts are rotated in the dismounting direction. As a result, the rotation of the large diameter nuts in the dismounting direction has frequently rotated the socket nuts off of the studs rather than rotated the large diameter nuts off of the socket nuts. Where this has happened, the socket nuts and the large diameter nuts occupy and block the openings in the web of the outermost wheel, but can rotate relative to that web. Considerable, and even great, difficulty has been experienced in removing such socket nuts and large diameter nuts; and in many instances it has been necessary to cut the large diameter nuts away from the socket nuts with a hack saw or with a cutting torch.

The separation of a socket nut from a threaded stud is usually easier than the separation of a large diameter nut from the external thread on a socket nut, because the diameter of the threads on the stud is materially smaller than the diameter of the threads on the large diameter nut. Consequently, there is a greater circumference, and a greater resulting frictional resistance to rotation, in the case of the large diameter nut and the external threads on the socket nut than there is in the case of the socket nut and the threaded stud. There is a common problem, therefore, of having the large diameter nut adhere to the socket nut while the socket nut becomes separated from the stud on the hub during dismounting of the large diameter nut. The present invention solves this problem by making it possible to easily separate the large diameter nut from the socket nut. This is done by providing a two socket wrench which simultaneously engages and holds the polygonal wrench-receiving surface on the socket nut and the polygonal wrench-receiving surface on the large diameter nut. Furthermore, after the two sockets of the wrench are in engagement with those wrench-receiving surfaces, it is possible to simultaneously apply relative rotative forces to those wrench-receiving surfaces and thus to the socket nut and the large diameter nut. It is therefore an object of the present invention to provide a wrench which can simultaneously apply relatively rotative forces to the wrench-receiving surfaces on the socket nut and on the large diameter nut threaded onto that socket nut.

The wrench provided by the present invention is useful in mounting the dual wheels as well as being useful in dismounting those wheels. Without the wrench provided by the present invention, tightening of the large diameter nut can cause the socket nut to rotate on the stud. Any such rotation of the socket nut relative to the stud, during mounting of the wheel, can be avoided by having one socket of the wrench hold the socket nut while the other socket of the wrench can rotate the large diameter nut.

The ability of the wrench provided by the present invention to provide simultaneous, relatively rotative forces, to the socket nut and to the large diameter nut threaded onto the external thread of that socket nut, makes it possible to separate those two nuts from the outermost wheel of a duel wheel arrangement even if the socket nut should become separated from the stud carried by the hub of the automotive vehicle. As a result, the operator of the automotive vehicle is not restricted to, and does not necessarily depend upon, the frictional resistance between the threaded stud carried by the hub and the internal thread of the socket nut to hold that socket nut while the large diameter nut is threaded off of the external thread of that socket nut. Instead, the wrench provided by the present invention applies a definite and positive holding force to the socket nut while applying a definite and positive dismountnig force to the large diameter nut.

The wrench provided by the present invention has two telescoped tubes, and each of those tubes has its own handle. The lengths of the tubes are such that the inner tube will project beyond the end of the outer tube; and this makes it easy for the operator to align the socket of the inner tube with, and to telescope that socket over the wrench-receiving surface on the socket nut. It is therefore an object of the present invention to provide a wrench with two telescoping tubes and to have the inner tube longer than the outer tube.

The innermost tube of the wrench provided by the present invention has a socket that fits closely within but can rotate relative to the outer tube, and the outer tube has an end wall with an opening that receives the opposite end of the inner tube. The portions of the end wall that define the opening serve as a bearing for the opposite end of the inner tube, and the socket of the inner tube serves as a bearing for its end of the inner tube; and those bearings facilitate ready rotation of the outer tube relative to the inner tube.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only; and do not limit the invention and that the invention will be defined by the appended claim.

In the drawing, Fig. 1 is an end elevational view of one embodiment of a wrench that is made in accordance with the principles and teachings of the present invention, Fig. 2 is a side elevational view of the wrench shown in Fig. 1, and it shows the two parts of that wrench in fully telescoped position by solid lines and it shows the two parts of that wrench in partially telescoped position by dotted lines, Fig. 3 is a sectional view, on an enlarged scale, of the left-hand ends of the two parts of the wrench shown in Fig. 2, Fig. 4 is a sectional end view through the wrench of Figs. 1–3, and it is taken along the plane indicated by the line 4—4 in Fig. 3, Fig. 5 is a sectional view, on said enlarged scale, of the right-hand ends of the two parts of the wrench shown in Figs. 1–3, and Fig. 6 is a side elevational view of the socket nut and large diameter nut to be acted upon by the wrench provided by the present invention.

Referring to the drawing in detail, the numeral 10 denotes an elongated, sturdy tube. The left-hand end of that tube is denoted by the numeral 12, and that end has a larger outside diameter than the rest of that tube. The interior of the enlarged end 12 of tube 10 has a hexagonal nut-receiving surface 14. The enlarged end 12 with its hexagonal nut-receiving surface 14 can be made an integral part of the tube 10 by forging, by welding or by any other suitable method known to those skilled in the art. Although the nut-receiving surface 14, as shown in the preferred embodiment of the present invention, is hexagonal, that nut-receiving surface can be made with different polygonal surfaces to accommodate differently shaped large diameter nuts. The right-hand end of the tube 10 is denoted by the numeral 16 and that end has an opening 17 through it. The opening 17 is concentric with the tube 10 and with the enlarged end 12 of that tube.

An elongated handle 18 is secured to the tube 10 adjacent the right-hand end thereof; and, in the particular modification shown, that handle is formed of two sections that are welded to the tube 10 at the opposite ends of a diameter of that tube. A disc 20 of annular configuration is formed of two semi-annular plates; and those semi-annular plates are welded to the handle 18 and to the exterior of the tube 10. The resulting annular disc strongly reinforces the connection between the handle 18 and the tube 10, and it integrates that handle and tube into a unitary structure. The handle 18 is proximate the outer end of the tube 10.

The numeral 22 denotes an elongated, sturdy tube 22 which has an outside diameter smaller than the inside diameter of the opening 17 in the end 16 of tube 10.

A socket 24 is formed at the left-hand end of the tube 22, and that socket has an internal, square, nut-receiving surface 26. This square, nut-receiving surface 26 is also a preferred embodiment of the present invention but can be easily constructed to accommodate socket nuts having different configurations. The socket 24 can be formed as an integral part of the tube 22 by a method such as forging, or it can be formed separately and thereafter welded or otherwise secured to the left-hand end of that tube. The outside diameter of the socket 24 is less than the inside diameter of tube 10 but is greater than the diameter of opening 17 in the end 16 of tube 10.

The numeral 28 denotes an elongated handle which is welded or otherwise secured to the right-hand end of the tube 22. The tube 22 will have its right-hand end telescoped through the opening 17 in wall 16 of the tube 10 before that right-hand end is welded to the handle 28. Once the right-hand end of tube 22 has been telescoped through the opening 17 in wall 16 of tube 10 and has been suitably secured to handle 28, the tube 10 and the tube 22 can be telescoped relative to each other but cannot be separated. This is desirable because both relative rotation and relative telescoping of the two tubes 10 and 22 are desired, but separation of those tubes is not desired.

As indicated particularly in Fig. 2, the tube 22 is longer than the tube 10 so the socket 24 of tube 22 can project beyond the left-hand end 12 of the tube 10. This makes it easy for the operator to align the socket 24 with the wrench-receiving surface of the socket nut and to telescope that socket over that surface. The greater length of tube 22 also makes certain that the handle 28 will be spaced to the right of the handle 18; and this enables the operator to grasp the handle 28 without his hand being struck and hurt by the handle 18 as he rotates the two handles relative to each other. This is important since the two handles must be so rotated when the wrench is in use.

The numeral 30 denotes a square, wrench-receiving surface on a socket nut; and the numeral 32 denotes an external thread on that nut. The external thread 32 starts at the left-hand edge of the wrench-receiving surface 30, and it extends to a point just short of a radially-extending, tapered flange 24. That flange surrounds the end of an internally threaded socket of the socket nut. Socket nuts are a standard item of manufacture and are used to hold the innermost wheel of a pair of dual wheels on the threaded studs of the hub of a truck or other automotive vehicle. In particular, the internally threaded socket is threaded onto one of the threaded studs carried by the hub of the wheel of the vehicle after the innermost wheel has been telescoped over that stud. The inner face of the tapered flange 34 will bear against the web of that wheel and force that wheel tightly against the hub. Thereafter, the outermost wheel is telescoped over the wrench-receiving surface 30 of the socket nut and over the external thread 32 of that nut and is pressed against the outer face of the tapered flange 34. When the outermost wheel is set in place, a large diameter, internally-threaded nut 36 is telescoped over the square wrench-receiving surface 30, and threaded onto the external thread 32, of the socket nut. The nut 36 has a hexagonal wrench-receiving surface, and that nut is rotated on the external thread 32 until the left-hand end of that nut presses the web of the outermost wheel tightly against the outer face of the tapered flange 34.

If the socket nut can be threaded tightly onto the threaded stud carried by the hub of the automotive vehicle, that socket nut will remain stationary as the large diameter nut 36 is rotated onto and off of the external thread of that socket nut. Unfortunately, however, the socket nut does not always remain stationary on the stud carried by the hub of the automotive vehicle, and this is particularly true where the large diameter nut has been tightened onto the external thread 32 with considerable force. In those instances where the socket nut does not remain stationary on the stud, when the large diameter nut is being rotated to dismount it, the socket nut and the large diameter nut will tend to rotate together and to remain in engagement with the outermost wheel, and this is highly objectionable because it is exceedingly difficult, thereafter, to separate the large diameter nut from the socket nut. In some instances, it has been necessary to cut the socket nut in two, as with a cutting torch or a hack saw.

The two part wrench provided by the present invention prevents undesired separation of the socket nut from the threaded stud carried by the hub of the automotive vehicle, even during the loosening of the large diameter nut, as by enabling the operator to hold the socket nut stationary while rotating the large diameter nut off of the external thread 32 of the socket nut. In particular, the operator can telescope the square nut-receiving surface 26 of the socket 24 over the square wrench-receiving surface 30 of the socket nut at the same time he telescopes the hexagonal nut-receiving surface 14 of the enlarged end 12 over the hexagonal wrench-receiving surface of the nut 36. The engagement between the respective nut-receiving surfaces of the sockets of the wrench and the wrench-receiving surfaces of the nuts is so intimate that relative rotation of tubes 10 and 22 will enable the large diameter nut 36 to be threaded off of the socket nut while that socket nut is held fixed against rotation. In this way, all of the difficulties heretofore encountered in the mounting and dismounting of dual wheels and their socket nuts are eliminated.

One particular advantage of having the tube 22 longer than the tube 10 is that it enables the socket 24 to be extended out beyond the enlarged end 12 of the tube 10 so the operator can accurately guide the socket 24 onto, and telescope it over, the square wrench-receiving surface 30 of the socket nut. Once the socket 24 of tube 22 is solidly seated on the wrench-receiving surface 30, the tube 10 can be rotated by means of the handle 18 until the hexagonal nut-receiving surface 14 is in register with the hexagonal wrench-receiving face of the large diameter nut 36. Then the tube 10 can be telescoped over the socket 24 until the wrench-receiving surface 14 engages and holds the nut-receiving surface of the nut 36.

Whereas the drawing and accompanying description have shown and described a preferred embodiment of the present invention, it should be apparent to those skilled in the art that various changes may be made in the form of the invention without affecting the scope thereof.

What we claim is:

A wrench that is adapted to hold a socket nut stationary while rotating a large diameter nut relative to the socket nut, that comprises an elongated tube having a substantially constant internal diameter and, said tube having an enlarged end and having a polygonal nut-receiving surface at the interior of said enlarged end that can receive and hold said large diameter nut, said tube having a wall adjacent the opposite end thereof and having a concentric opening in said wall, said tube having a handle thereon adjacent said opposite end of said tube, and an elongated support, said support having an enlarged end, the diameter of said enlarged end of said support being greater than the diameter of said opening in said wall, said support having the other end thereof telescoped through said tube and through said opening in said wall, said enlarged end of said support having a polygonal nut-receiving surface at the interior thereof that can receive and hold a wrench-receiving surface on said socket nut, said support having a handle adjacent said other end thereof, the portions of said wall that define said opening constituting a bearing for said support, said enlarged end of said support having a diameter smaller than the internal diameter of said tube, whereby said enlarged end of said support can be telescoped within said tube, said support being longer than said tube, whereby said enlarged end of said support can project outwardly beyond said enlarged end of said tube, said support being freely movable both axially and circumferentially of said tube, said handles on said tube and on said support being adjacent each other whenever said nut-receiving surfaces on said tube and on said support are adjacent each other.

References Cited in the file of this patent
UNITED STATES PATENTS

| | | |
|---|---|---|
| 1,268,282 | Royer | June 4, 1918 |
| 1,396,591 | Reist | Nov. 8, 1921 |
| 2,055,262 | Queen | Sept. 22, 1936 |
| 2,185,058 | Graham | Dec. 26, 1939 |
| 2,267,012 | Bowne | Dec. 23, 1941 |
| 2,772,590 | Werries | Dec. 4, 1956 |
| 2,790,343 | White | Apr. 30, 1957 |

FOREIGN PATENTS

| | | |
|---|---|---|
| 569,735 | Great Britain | June 6, 1945 |